US012272353B2

(12) United States Patent
Zhou

(10) Patent No.: US 12,272,353 B2
(45) Date of Patent: Apr. 8, 2025

(54) SYSTEM FOR ENHANCING SPEECH UNDERSTANDING WITH EFFECTIVE AND EFFICIENT INTEGRATION OF AUTOMATED SPEECH RECOGNITION ERROR CORRECTION, OUT-OF-DOMAIN DETECTION, AND/OR DOMAIN CLASSIFICATION

(71) Applicant: Robert Bosch GmbH, Stuttgart (DE)

(72) Inventor: Zhengyu Zhou, Fremont, CA (US)

(73) Assignee: Robert Bosch GmbH (DE)

( * ) Notice: Subject to any disclaimer, the term of this patent is extended or adjusted under 35 U.S.C. 154(b) by 282 days.

(21) Appl. No.: 17/952,503

(22) Filed: Sep. 26, 2022

(65) Prior Publication Data

US 2024/0105170 A1    Mar. 28, 2024

(51) Int. Cl.
*G10L 15/197* (2013.01)
*G06F 40/117* (2020.01)
*G06F 40/20* (2020.01)
*G06F 40/35* (2020.01)
*G10L 15/16* (2006.01)
*G10L 15/22* (2006.01)

(52) U.S. Cl.
CPC .......... *G10L 15/197* (2013.01); *G06F 40/117* (2020.01); *G06F 40/20* (2020.01); *G06F 40/35* (2020.01); *G10L 15/16* (2013.01); *G10L 15/22* (2013.01)

(58) Field of Classification Search
None
See application file for complete search history.

(56) References Cited

U.S. PATENT DOCUMENTS

| 9,959,861 | B2 | 5/2018 | Zhou et al. |
| 10,453,117 | B1 * | 10/2019 | Reavely ................. G06N 5/027 |
| 11,043,205 | B1 * | 6/2021 | Su ......................... G10L 15/183 |
| 11,195,522 | B1 * | 12/2021 | Makashir ............ G10L 15/1815 |
| 11,308,281 | B1 * | 4/2022 | Craft ..................... G06F 40/284 |

(Continued)

OTHER PUBLICATIONS

Chen et al., "BERT for Joint Intent Classification and Slot Filling," arXiv:1902.10909v1, 2019, 6 pages.

(Continued)

*Primary Examiner* — Jesse S Pullias
(74) *Attorney, Agent, or Firm* — Dickinson Wright PLLC

(57) ABSTRACT

The systems and methods described herein are related to a new speech understanding system for domain-specific voice interaction. The systems and methods described herein combine the automatic correction of an automatic speech recognition errors with a natural language understanding model in a way that optimizes the recognition and understanding of a received speech input. The systems and methods described herein may further support out-of-domain detection or domain classification by jointly learning and/or performing automatic speech recognition error correction and domain-related classification. Through the joint learning with automatic speech recognition error correction, the out-of-domain detection or domain classification may be conducted based on a plurality of possible speech recognition results with shared feature inputs and shared neural layers. The systems and methods described herein may achieve robust performance with high computational efficiency.

15 Claims, 10 Drawing Sheets

(56) References Cited

U.S. PATENT DOCUMENTS

2020/0409943 A1* 12/2020 Diefenbach ............ G06F 40/205
2021/0074279 A1*  3/2021 Rastogi .................... G10L 15/30
2022/0199079 A1*  6/2022 Hanson .................... H04L 51/02

OTHER PUBLICATIONS

Liu et al., "Attention-Based Recurrent Neural Network Models for Joint Intent Detection and Slot Filling," arXiv:1609.01454v1, 2016, 5 pages.

Wang et al., "A Bi-model based RNN Semantic Frame Parsing Model for Intent Detection and Slot Filling," arXiv:1812.10235v1, 2018, 6 pages.

Zhou et al., "A Neural Network Based Ranking Framework to Improve ASR With NLU Related Knowledge Deployed," IEEE ICASSP, 2019, 5 pages.

* cited by examiner

SYSTEM FOR ENHANCING SPEECH UNDERSTANDING WITH EFFECTIVE AND EFFICIENT INTEGRATION OF AUTOMATED SPEECH RECOGNITION ERROR CORRECTION, OUT-OF-DOMAIN DETECTION, AND/OR DOMAIN CLASSIFICATION

TECHNICAL FIELD

The present disclosure relates generally to an automatic speech understanding system utilizing at least a speech recognition model and at least a natural language understanding model to provide a robust system for providing reliable human-machine interaction without requiring a large increase in computational load.

BACKGROUND

Automatic speech understanding is a technology of the recognition and translation of spoken language into a format understood by a computer system. The spoken language or speech is received via a microphone, or other input and processed to generate text associated with the speech by a speech recognition component of the speech understanding system. The text is then understood based on the context and meaning of the text. Once the speech has been understood by the system, it can be used as an input to a computer, computer system, or another system via this interface such that normal human conversation can be used to control the system.

Voice interaction has been popular in consumer markets, especially in recent years and shows increasing potential in vertical applications such as various service/manufacturing assistants. For voice interaction, speech understanding is one important component. Robust speech understanding, which has been a major challenge for modern voice interaction, is essential to achieve a satisfactory user experience, especially for vertical domains. In addition to robustness, efficiency is another aspect that directly affects user experience. In the systems and methods described herein, a new speech understanding system for domain-specific voice interaction is proposed, optionally supporting out-of-domain detection or/and domain classification, with the aim of optimizing understanding robustness and maximizing the system efficiency at the same time.

SUMMARY

The systems and methods described herein provide for automated speech understanding transcription by a multiple machine learning model set up, intended for use with voice interaction interfaces.

An aspect of the disclosed embodiments includes a method for identifying a text string associated with a speech input. The method includes receiving a speech input from a speech-based dialogue interface, generating, by at least one speech recognition model, first and second text transcription predictions by converting the speech input into respective text strings, and generating a first confidence score for the first text transcription prediction and a second confidence score for the second text transcription prediction. The method also includes determining a slot type for respective text strings of the first text transcription prediction and the second text transcription prediction, applying tags to the respective text strings of the first text transcription prediction and the second text transcription prediction based on the slot type for each respective text string. Each tag corresponds to one of the slot types. The method also includes generating at least one tagged text group by extracting at least one text string of the first text transcription prediction and grouping the at least one text string with at least one text string of the second text transcription prediction based on a tag associated with the text strings. The method also includes determining, using a natural language model, a relevance ranking of the text strings within the at least one tagged text group based on, at least, the slot type of the tag associated with the tagged text group, the first confidence score, and the second confidence score. The method also includes identifying a text string of the at least one tagged text group having a highest relevance ranking, wherein the text string of the at least one tagged text group having the highest relevance ranking is provided to the speech-based dialogue interface.

Another aspect of the disclosed embodiments includes a system for outputting, at a speech-based dialogue interface, a text string associated with a speech input. The system includes a processor and a memory. The memory includes instructions that, when executed by the processor, cause the processor to: receive a speech input from a speech-based dialogue interface; generate, by at least one speech recognition model, first and second text transcription predictions by converting the speech input into respective text strings; generate a first confidence score for the first text transcription prediction and a second confidence score for the second text transcription prediction; determine a slot type for respective text strings of the first text transcription prediction and the second text transcription prediction; apply tags to the respective text strings of the first text transcription prediction and the second text transcription prediction based on the slot type for each respective text string, wherein each tag corresponds to one of the slot types; generate at least one tagged text group by extracting at least one text string of the first text transcription prediction and grouping the at least one text string with at least one text string of the second text transcription prediction based on a tag associated with the text strings; determine, using a natural language model, a relevance ranking of the text strings within the at least one tagged text group based on, at least, the slot type of the tag associated with the tagged text group, the first confidence score, and the second confidence score; identify a text string of the at least one tagged text group having a highest relevance ranking; and output the text string of the at least one tagged text group having the highest relevance ranking to the speech-based dialogue interface.

Another aspect of the disclosed embodiments includes an apparatus for identifying a text string associated with a speech input. The apparatus includes a processor and a memory. The memory includes instructions that, when executed by the processor, cause the processor to: receive a speech input from a speech-based dialogue interface; generate, by at least one speech recognition model, first and second text transcription predictions by converting the speech input into respective text strings; generate a first confidence score for the first text transcription prediction and a second confidence score for the second text transcription prediction; determine a slot type for respective text strings of the first text transcription prediction and the second text transcription prediction; apply tags to the respective text strings of the first text transcription prediction and the second text transcription prediction based on the slot type for each respective text string, wherein each tag corresponds to one of the slot types; generate at least one tagged text group by extracting at least one text string of the first text transcription prediction and grouping the at least one text string with at least one text string of the second text transcription prediction based on a tag associated with the text strings; determine, using a natural language model, a relevance ranking of the text strings within the at least one tagged text group based on, at least, the slot type of the tag associated with the tagged text group, the first confidence score, and the second confidence score; and identify a text string of the at least one tagged text group having a highest relevance ranking.

DETAILED DESCRIPTION

Figure 1:
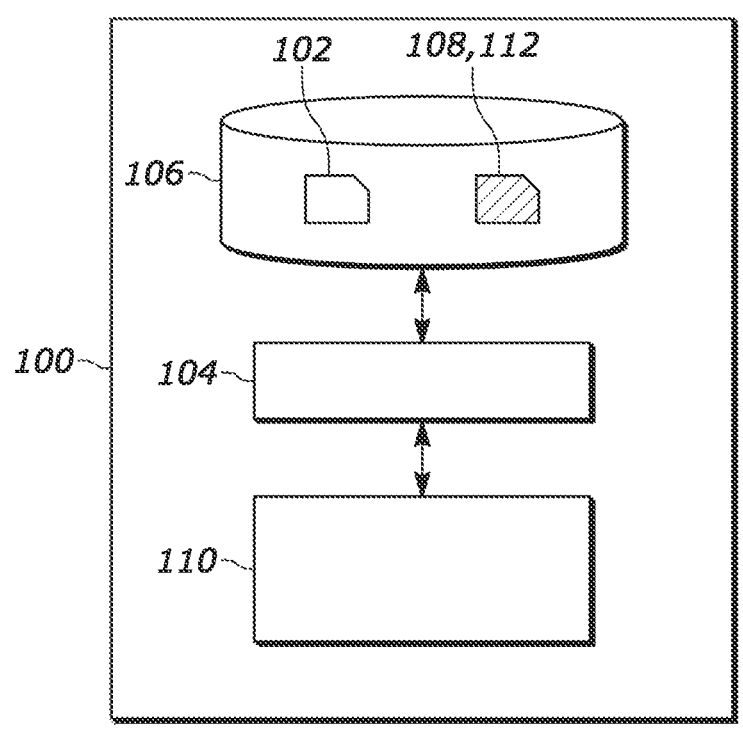
FIG. 1 generally illustrates a system for training a neural network, according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The systems and methods described herein are directed to a new speech understanding system for domain-specific voice interaction. The systems and methods described herein combine the automatic correction of automatic speech recognition errors and natural language understanding in a way that optimizes the understanding accuracy, especially for unseen slot values, while also maximizing the efficiency of the systems and methods described herein. The systems and methods described herein can be extended to support out-of-domain detection by jointly learning and/or performing automatic speech recognition error correction and out-of-domain detection for single-domain domain-specific applications. The systems and methods described herein may also extend to support domain detection for multi-domain domain-specific applications, by jointly learning and/or performing automatic speech recognition error correction and domain classification. The systems and methods described herein may include joint learning with automatic speech recognition error correction, the task of out-of-domain detection or domain classification can be conducted based on N-best speech recognition results with shared features and shared neural layers, and thus achieves robust performance for out-of-domain-detection and/or domain-classification with only small additional computational load, which further benefits the overall system efficiency.

The systems and methods described herein may include a new speech understanding system for domain-specific voice interaction. The systems and methods described herein may be especially suitable for those voice interaction applications with (1) pre-defined slot-value lists available and (2) limited amount of in-domain training data, which are typical situations for many vertical use cases. The systems and methods described herein may include integrating automatic speech recognition error-correction, class-based natural language understanding, and word-based natural language understanding for voice interaction in a novel way based on holistic usage of tagging knowledge across automatic speech recognition error-correction and natural language understanding selection/inference, with the aim of optimizing the performance as well as maximizing the efficiency.

Given an input speech utterance from the user, the systems and methods described herein, first utilize an automatic speech recognition component to transcribe the input speech into text, generating N-best speech recognition results (i.e., automatic speech recognition hypotheses). Typically, the automatic speech recognition component involves one state-of-the-art online/embedded automatic speech recognition engine, which generates N-best results per utterance. The systems and methods described herein may use multiple automatic speech recognition engines in the automatic speech recognition component. The automatic speech recognition hypotheses generated per engine can be merged together (and optionally ranked in a certain way) to output the final N-best speech recognition results. The N-best results are passed on to the subsequence automatic speech recognition error-correction procedure. Note that if the confidence score per hypothesis can also be generated by the automatic speech recognition engine or calculated in a certain way by the automatic speech recognition component, the confidence score for each one of the N-best hypotheses can also be provided to the subsequent automatic speech recognition error-correction procedure, providing additional features to facilitate error correction.

The systems and methods described herein may include an automatic speech recognition error-correction procedure which contains two parts: (1) the tagging & feature extraction component and (2) the automatic speech recognition-result re-ranking component. Given the N-best speech recognition results (optionally with confidence scores) provided by the proceeding automatic speech recognition component, the tagging & feature extraction component conducts tagging based on a set of pre-defined slot-value lists and extracts features from the competing automatic speech recognition results/hypotheses. Using the extracted features, the automatic speech recognition-result re-ranking component conducts error correction by re-ranking the competing automatic speech recognition results through certain mechanisms (e.g., neural network model, pairwise classification with Random Forest classifier). The top-ranked automatic speech recognition result/hypothesis generated by this component is the result of our automatic speech recognition error-correction procedure. It is viewed as the new automatic speech recognition result, and together with the corresponding tagging result (previously obtained in the Tagging & Feature Extraction Component), sent to the subsequence natural language understanding procedure.

For the tagging & feature extraction component, it first processes each competing hypothesis by tagging the slot value(s) contained in the sentence (e.g., "San Francisco" in "I will fly to San Francisco tomorrow") with corresponding tag(s) (e.g., City_Name). The systems and methods described herein define tags (e.g., "Song_Name") mainly based on the pre-defined slot-value lists (e.g. song list), but also considering the possible common characteristics across different slot types. For example, suppose in a target application, "flight-departure city", "flight-arrival city", "tourist-destination city" are three different slot types with pre-defined slot-value lists given. Since all the three slot types involve city names, the systems and methods described herein define a "City_Name" tag, and merge the distinct names in the "flight-departure city", "flight-arrival city" and "tourist-destination city" lists into a city-name list for the "City_Name" tag. During the tagging procedure, the systems and methods described herein label each city name that occurs in the city-name list in a competing automatic speech recognition result as "City_Name". Whether or not this city is a "flight-departure city", "flightarrival city" or "tourist-destination city" is a decision that will be made by the natural language understanding procedure based on the sentence context. In short, the systems and methods described herein group those slot types that are similar in terms of linguistic usage into one tag, in order to ensure the robustness of the automatic speech recognition error-correction procedure. For the remaining slot type that should not be grouped, the systems and methods described herein treat each slot type as one tag, and tag the related names based on the corresponding given slot-value list. In the training mode, when the ground-truth slot value labeling is available, the tagging procedure labels each slot value in a sentence with the corresponding tag. In the inference/testing mode, for each automatic speech recognition hypothesis, the systems and methods described herein search through all the slot-value/grouped lists to label possible tags in the sentence. When there are multiple possible ways to tag the sentence (e.g., one name may occur in multiple slot-value/grouped lists), the systems and methods described herein make multiple copies of the focused hypothesis and tag each copy using one way of tagging. By doing so, the systems and methods described herein may extend the original list of competing automatic speech recognition hypotheses when multiple possibilities of tagging are present.

For both training and testing, the systems and methods described herein may include an empty hypothesis in the list of automatic speech recognition hypotheses, with the goal of capturing the situation that all the possible automatic speech recognition results are wrong. For such empty hypothesis, the tagging result is of course also empty.

With the tagging results ready, the Tagging & Feature Extraction Component then conducts feature extraction. For each competing hypothesis, various features can be extracted from the word sequences, the tag information, and/or the confidence score to facilitate the subsequent error correction.

The systems and methods described herein may adopt a trigger feature, which captures the co-occurrence relationship between words/tags (e.g., "play"→Song_Name), the bag-of-words feature, and the confidence feature for feature extraction, where the three types of features are defined/extracted.

The automatic speech recognition-result Re-ranking Component, of the systems and methods described herein, may conduct error correction by re-ranking the competing automatic speech recognition hypotheses given the features extracted from the proceeding Tagging & Feature Extraction Component per hypothesis. The re-ranking can be fulfilled with different types of models. In one implementation, the component is implemented with a pairwise classification algorithm, which using a binary classifier (using Random Forest, SVM or certain other classification algorithm) to conduct pairwise classification for ranking based on extracted features. In another implementation, using a neural network, where the output layer only includes the "automatic speech recognition ranking output" part. The output of the automatic speech recognition-result re-ranking component is the top-ranked automatic speech recognition hypothesis, which is viewed as the new automatic speech recognition result, (i.e., the automatic speech recognition-error-correction result).

Based on the new automatic speech recognition result achieved, the systems and methods described herein proceed by choosing an appropriate natural language understanding model to handle it. If the new automatic speech recognition result is the empty hypothesis, which indicates a complete failure of the automatic speech recognition engine(s) on the transcription of the speech, the systems and methods described herein make use of no natural language understanding model and directly generate a response that informs the user about the automatic speech recognition failure and optionally asks the user to repeat. Otherwise, the new automatic speech recognition result is sent to either a class-based natural language understanding model or a word-based natural language understanding model for intent detection and slot filling, according to whether the automatic speech recognition result contains essential tag(s) in tagging result of the systems and methods described herein (which is obtained in the previous tagging & feature extraction component).

The systems and methods described herein use essential tags which are tags whose relevant slot values are not numbers, dates, times (e.g., 10 am), or durations (e.g., 45 minutes). For a non-empty new automatic speech recognition result, if the result contains one or more essential tags, it is sent to a class-based natural language understanding component to conduct intent detection and slot filling, either jointly or separately. The systems and methods described herein may train the class-based natural language understanding model(s) in this component based on tagged training data, which is tagged using the same tagging procedure as in the tagging & feature extraction component. Given an automatic speech recognition result (e.g., "I plan to fly from San Francisco to Boston"), the class-based natural language understanding model(s) uses the corresponding tagged sentence (e.g., "I plan to fly from City_Name to City_Name") as the input, and predicts the slot filling results (e.g., "from "flight-departure city" to "flight-arrival city") as well as the intent detection result (e.g., "flight").

In the systems and methods described herein, if a non-empty new automatic speech recognition result contains no essential tag, the automatic speech recognition result is sent to a word-based natural language understanding component, which uses certain natural language understanding model(s) to conduct slot filling and intent detection jointly/separately based on the word sequences of the automatic speech recognition result. Since the major task of this natural language understanding component is to handle those sentences containing unseen slot values (i.e., those slot values not included in the corresponding predefined slot-value lists), the word-based natural language understanding model(s) in this component is trained in a way that strengths the model capability to handle unseen slot values. The systems and methods described herein may adjust the training data of the word-based natural language understanding model(s) using a proposed 2-step method as follows, For each intent (e.g., "flight") that involves those essential slots that are extendable (an extendable slot refers to a slot that new slot value beyond the predefined list may show in the inference scenario):

The first step where among those training sentences containing one or more extendable essential slot values select at least a significant portion (percentage>Threshold) of the sentences for modification. The Threshold is a tunable parameter, and can be tuned per intent.

The second step where the systems and methods described herein modify the selected sentences by replacing the values of the extendable essential slots in these sentences to make sure that each value of each extendable essential slot only occurs once. Given a sentence, a value of an extendable essential slot in this sentence can be replaced with another unused value in the corresponding predefined slot-value list, when necessary. The word-based natural language understanding model(s) is trained on the adjusted training data. In this way, the systems and methods described herein may force the word-based natural language understanding model(s) to predict slots/intents mainly based on the sentence context (instead of the slot values), leading to a more robust performance on the sentences containing unseen slot values.

In the systems and methods described herein, both the class-based natural language understanding component and word-based natural language understanding component generate M-best natural language understanding results for intent detection and slot filling as the output. These M-best natural language understanding results together with the confidence scores of the natural language understanding results are sent to the next component, the clarification checking component, for further processing. The clarification checking component may determine the understanding results achieved are unreliable (i.e., user clarification is needed), using a certain algorithm based on the information contained in the M-best natural language understanding results, the systems and methods described herein generate a response to ask the user to clarify whether the detected intent and/or slot value(s) are correct. Otherwise (i.e., if user clarification is deemed as unnecessary), the systems and methods described herein send the final natural language understanding result, which could (1) simply be the top-best natural language understanding result or (2) a natural language understanding result generated from the M-best natural language understanding results using a certain algorithm, to the dialogue management part in domain-specific voice interaction to continue the dialogue with the user.

The systems and methods described herein are suitable for those domain-specific voice interaction applications where the voice input from the user per dialog turn is mostly a single sentence that contains no or a few slot values. For such scenarios, the use of the systems and methods described herein will improve the understanding robustness. First, the automatic speech recognition error-correction procedure will provide a more reliable sentence for natural language understanding to understand, reducing the error propagation from automatic speech recognition to natural language understanding. Second, by using the class-based natural language understanding model to understand those sentences containing essential slot values that are included in the predefined slot-value lists, the understanding robustness will be enhanced for those sentences compared with using word-based natural language understanding model, especially for the sentences that contains under-represented essential slot values (i.e., those pre-defined essential slot values that only occur a few times each or are not included at all in the training data). Third, by using the word-based natural language understanding model especially trained to handle unseen slot values (i.e., those valid slot values out of the predefined slot-value lists), the understanding performance for those sentences containing unseen slot values will also be significantly enhanced.

The systems and methods described herein are also advantageous in system efficiency, because of the holistic design of the knowledge sharing across different components. The tagging process is only done once by the systems and methods described herein and the tag information achieved is shared in the automatic speech recognition error-correction procedure and the class-based natural language understanding component, avoiding duplicate tagging computation for typical stand-alone class based natural language understanding. By using the tagging information in the automatic speech recognition-error-correction result, class-based natural language understanding model will be used to process a portion of user utterances (those containing pre-defined essential slot values), and the relatively computationally expensive word-based natural language understanding model will only be applied when needed (i.e., when no pre-defined essential slot value is found). Compared with applying word-based natural language understanding model(s) to process every user utterance, the computation saved is significant.

The systems and methods described herein may include a domain-specific voice interaction application because it is desirable to detect out-of-domain user inputs (i.e., those speech utterances that are beyond the target domain(s) of the application) so that (1) the natural language understanding can focus on the in-domain sentences to generate more reliable results and (2) appropriate response can be provided to the user when out-of-domain input occurs. The systems and methods described herein may jointly train automatic speech recognition error-correction and out-of-domain (out-of-domain) detection to optimize the performance and maximize the efficiency. The systems and methods described herein conduct automatic speech recognition error-correction and out-of-domain detection based on the same set of features extracted from the competing automatic speech recognition hypotheses (i.e., the output of the Tagging & Feature Extraction Component), and use one neural network with shared neural layers to learn the automatic speech recognition error-correction (i.e., automatic speech recognition-hypothesis re-ranking) task and out-of-domain detection task jointly. In this way, for out-of-domain detection, the performance of the systems and methods described herein will be more robust toward automatic speech recognition errors, because multiple possible automatic speech recognition hypotheses are considered for each utterance to determine whether or not the utterance is out-of-domain. At the same time, the added computational load due to the inclusion of the out-of-domain-detection function will be minimized, since (1) no additional feature extraction efforts are needed for out-of-domain detection and (2) only a small amount of additional neural-layer computation is needed (compared to the neural network for automatic speech recognition error-correction alone) to support out-of-domain detection.

The systems and methods described herein incorporates the out-of-domain detection function into the speech understanding system. The systems and methods described herein may replace the automatic speech recognition-result re-ranking component with a joint automatic speech recognition-result re-ranking and out-of-domain detection component, which conducts automatic speech recognition error-correction (i.e., re-ranking of competing automatic speech recognition hypotheses) and out-of-domain detection based on the same set of extracted features (those generated by the Tagging & Feature Extraction Component) using certain algorithm. If in the out-of-domain detection result, the utterance is determined as out-of-domain, the systems and methods described herein may generate a response to inform the user that the input is out of the voice interaction's capability to handle. Otherwise, the output of automatic speech recognition error-correction (i.e., the new automatic speech recognition result) will be processed in the same way as described above.

In the systems and methods described herein, the joint automatic speech recognition-result re-ranking and out-of-domain detection component include a joint-learning neural network as described above. The major difference in the network structure is that (1) two separate sets of inner layers above the shared inner layers are adopted for the automatic speech recognition-hypothesis re-ranking task and the out-of-domain detection task respectively, and (2) one output layer is used for out-of-domain detection, which contains one node computed with Sigmoid function to make binary prediction to predict out-of-domain (predicting 1: out-of-domain detected; predicting 0: not out-of-domain). The input features for the neural network of the systems and methods described herein are those provided by the tagging & feature extraction component (i.e., the trigger features, bag-of-words feature, and confidence feature). To support out-of-domain detection, an appropriate amount of out-of-domain utterances, which cover multiple areas, should be added into the training data to train the joint neural network. Once the neural network is trained, for inference computation in voice interaction applications, the only additional computation needed for the inclusion of the out-of-domain detection function is the computation associated with the separate inner layers for out-of-domain detection and the one-node out-of-domain-detection output layer.

For some domain-specific voice interaction applications, the systems and methods described herein may involve multiple domains, each domain of voice interaction having sets of intents and/or slots to understand. The systems and methods described herein may further support the domain classification function for such multi-domain voice interaction applications. Compared with the out-of-domain-detection related extended system, this domain-classification related extended system replaces the joint automatic speech recognition-result re-ranking and out-of-domain detection component with the joint automatic speech recognition-result re-ranking and domain classification component, in which the automatic speech recognition error-correction task and the domain classification task are jointly conducted using a neural network. Similar to the out-of-domain-detection related extended system, in the domain-classification related extended system, the joint automatic speech recognition-result re-ranking and domain classification component, also uses the features extracted from the competing automatic speech recognition hypotheses (i.e., those features provided by the as the tagging & feature extraction component) as the input. The neural network in this component has the same structure as the network proposed for joint out-of-domain-detection, except that the one-node output layer for out-of-domain-detection is replaced with a multi-node output layer for domain classification. The number of nodes in the domain-classification-related output layer is L+1, where L is the number of domains that are involved in the target application. In the domain-classification related output layer, L nodes represent the L domains (one node each domain), and the remaining one node represents the out-of-domain scenario. The domain-classification-related output layer is trained with the cross-entropy loss function.

The joint automatic speech recognition-result re-ranking and domain classification component generates new automatic speech recognition results as well as the domain classification result. If in the domain classification result, the input utterance is predicted as out-of-domain, the systems and methods described herein generate a response to inform the user that his/her input is beyond the capability of this voice interaction system. When the input utterance is predicted as one target domain, in case that one class-based natural language understanding model and one word-based natural language understanding model are trained per domain, the systems and methods described herein switch the class-based natural language understanding model and word-based natural language understanding model used in the system with the corresponding ones trained for the detected domain when necessary (i.e., if the detected domain is different from the domain of the previous utterance), and then process the new automatic speech recognition result in the same way as the speech understanding system. Note that the systems and methods described herein may train a whole class/word-based natural language understanding model to cover all the relevant domains. In this case, the predicted domain information can be fed into the overall class/word-based natural language understanding models together with the new automatic speech recognition result as one additional feature to improve the natural language understanding performance.

The systems and methods described herein are also advantageous in both performance and efficiency. The systems and methods described herein may conduct domain-classification based on the competing automatic speech recognition hypotheses generated by automatic speech recognition engine(s) and thus more robust towards automatic speech recognition errors (which is unavoidable for voice interaction). Since the domain classification task is conducted jointly with the automatic speech recognition error-correction task (i.e., automatic speech recognition-result re-ranking), using the same set of input features and shared neural layers in a joint-learning neural network, the inclusion of the domain classification function will introduce no additional feature extraction effort and only limited computation from domain-specific inner/output layers in the joint network, leading to high computational efficiency.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The systems and methods described herein may be configured to receive a speech input. The systems and methods described herein may be configured to generate, by at least one speech recognition model, at least a first text transcription prediction and a second text transcription prediction by converting the speech input into a text string. The systems and methods described herein may be configured to generate a first confidence score for the first text transcription prediction and a second confidence score for the second text transcription prediction. The systems and methods described herein may be configured to determine, for respective text strings of the first text transcription prediction and the second text transcription prediction, a tag type, based on the linguistic context of each respective text string. The systems and methods described herein may be configured to apply tags to the respective text strings of the first text transcription prediction and the second text transcription prediction based on the tag type for each respective text string of the first text transcription prediction and the second text transcription prediction, wherein each tag corresponds to one or more slot types. The systems and methods described herein may be configured to generate one tagged text group by extracting at least one text string of the first text transcription prediction and grouping the at least one text string with at least one text string of the second text transcription prediction, each text string included into the text group together with the corresponding tags if any. The systems and methods described herein may be configured to rank the text strings in the tagged text group based on the presentation of tags associated with each text string, the word sequence of each text string, and the confidence score of the corresponding text transcription prediction. The systems and methods described herein may be configured to determine, using a natural language understanding model, the intent and slots for the top-ranked text string.

The systems and methods described herein where the natural language understanding model is one of a class-based natural language understanding model and a word-based natural language understanding model.

The systems and methods described herein may be configured to select the class-based natural language understanding model in response to the tag of the top-ranked text string indicating an essential tag type, and select the word-based natural language understanding model in response to the tag of the top-ranked text string not indicating an essential tag type.

The systems and methods described herein include one empty text string with no tag associated with it into the tagged text group. The systems and methods described treat the case that the top-ranked text string in the tagged text group is the empty text string as a failure of automatic speech recognition and generate dialog response correspondingly.

The systems and methods described herein may be configured to apply multiple tags for a respective text string where there are multiple possible ways to tag the text, and associate a copy of the respective text string to the tagged text group associated with the respective tag.

The systems and methods described herein include the natural language understanding model having at least one layer configured to identify the intent and slots for the top-ranked text string.

The systems and methods described herein may be configured to receive a speech input. The systems and methods described herein may be configured to generate, by at least one speech recognition model, at least a first text transcription prediction and a second text transcription prediction by converting the speech input into a text string. The systems and methods described herein may be configured to generate a first confidence score for the first text transcription prediction and a second confidence score for the second text transcription prediction. The systems and methods described herein may be configured to determine, for respective text strings of the first text transcription prediction and the second text transcription prediction, a tag type, based on the linguistic context of each respective text string. The systems and methods described herein may be configured to apply tags to the respective text strings of the first text transcription prediction and the second text transcription prediction based on the tag type for each respective text string of the first text transcription prediction and the second text transcription prediction, wherein each tag corresponds to a slot type. The systems and methods described herein may be configured to generate at least one tagged text group by extracting at least one text string of the first text transcription prediction and grouping the at least one text string with at least one text string of the second text transcription prediction based on a tag associated with the at least one text string of the first text transcription prediction and a tag associated with the at least one text string of the second text transcription prediction. The systems and methods described herein may be configured to determine, using a natural language understanding model, a relevance ranking of the text strings within the at least one tagged text group based on the slot type of the tag associated with the tagged text group, a word sequence of the first text transcription prediction, a word sequence of the second text transcription prediction, the first confidence score, and the second confidence score.

The systems and methods described herein where the natural language understanding model is one of a class-based natural language understanding model and a word-based natural language understanding model.

The systems and methods described herein may be configured to select the class-based natural language understanding model in response to the tag of the top-ranked text string indicating an essential tag type, and select the word-based natural language understanding model in response to the tag of the top-ranked text string not indicating an essential tag type.

The systems and methods described herein include one empty text string with no tag associated with it into the tagged text group. The systems and methods described treat the case that the top-ranked text string in the tagged text group is the empty text string as a failure of automatic speech recognition and generate dialog response correspondingly.

The systems and methods described herein may be configured to apply multiple tags for a respective text string where there are multiple possible ways to tag the text, and associate a copy of the respective text string to the tagged text group associated with the respective tag.

The systems and methods described herein include the natural language understanding model having at least one layer configured to identify text that does not correspond to a slot type. The systems and methods described herein include the text strings being associated with a tagged text group having a similar linguistic usage.

FIG. 1 shows a system 100 for training a neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus the input of the processor subsystem 110, and by providing the equilibrium point as a substitute for an output of the stack of layers in the neural network.

The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
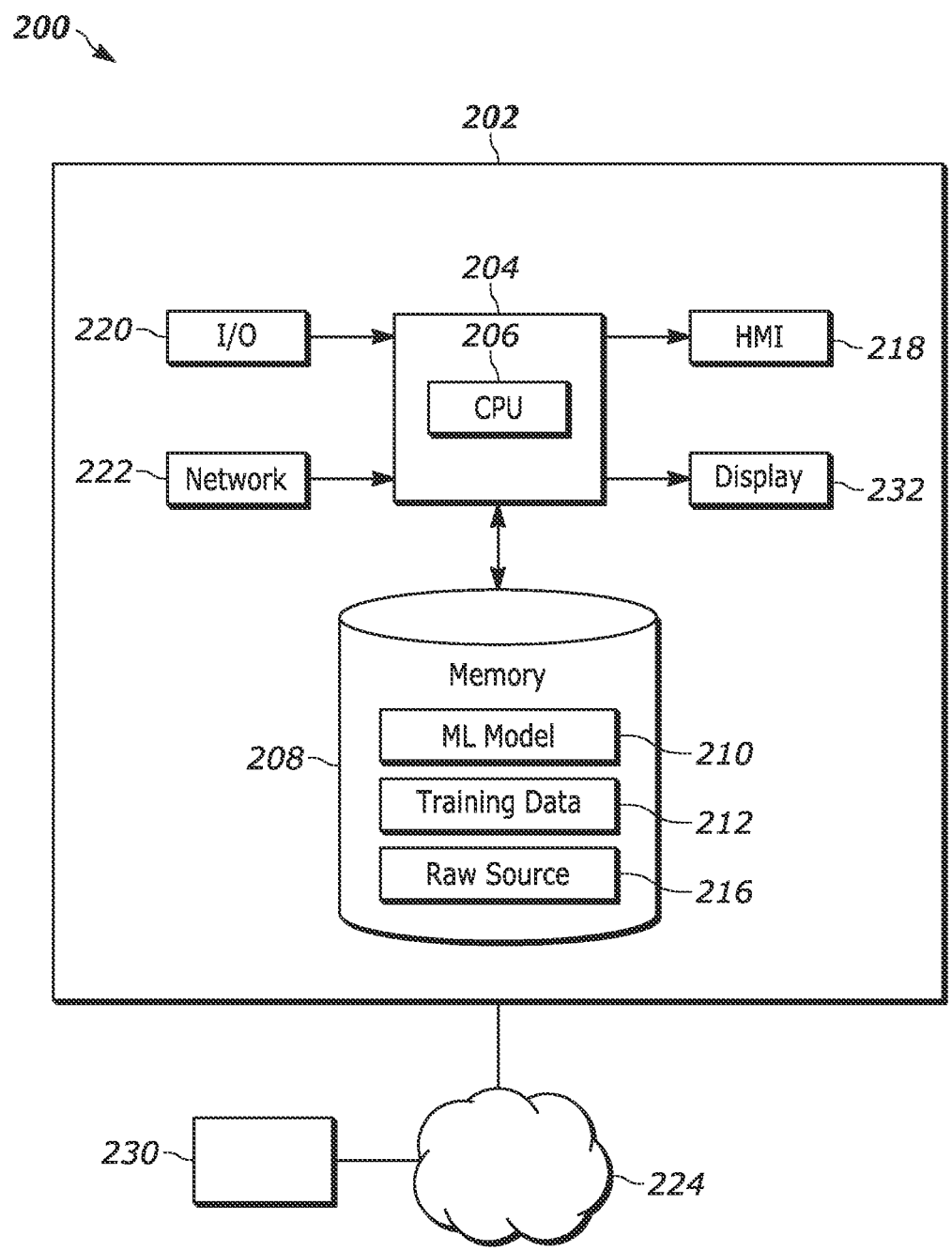
FIG. 2 generally illustrates a computer-implemented method for training and utilizing a neural network, according to the principles of the present disclosure.

FIG. 2 depicts a data annotation/augmentation system 200 to implement a system for annotating and/or augment data. The data annotation system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, and raw or partially processed sensor data (e.g., radar map of objects). In some embodiments, the machine-learning algorithm 210 may be a neural network algorithm that is designed to perform a predetermined function. For example, the neural network algorithm may be configured in automotive applications to identify pedestrians in video images.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which annotation results are desired. For example, the machine-learning algorithm 210 may be configured to identify the presence of a pedestrian in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., pedestrian). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

In the example, the machine-learning algorithm 210 may process raw source data 216 and output an indication of a representation of an image. The output may also include augmented representation of the image. A machine-learning algorithm 210 may generate a confidence level or factor for each output generated. For example, a confidence value that exceeds a predetermined high-confidence threshold may indicate that the machine-learning algorithm 210 is confident that the identified feature corresponds to the particular feature. A confidence value that is less than a low-confidence threshold may indicate that the machine-learning algorithm 210 has some uncertainty that the particular feature is present.

Figure 3:
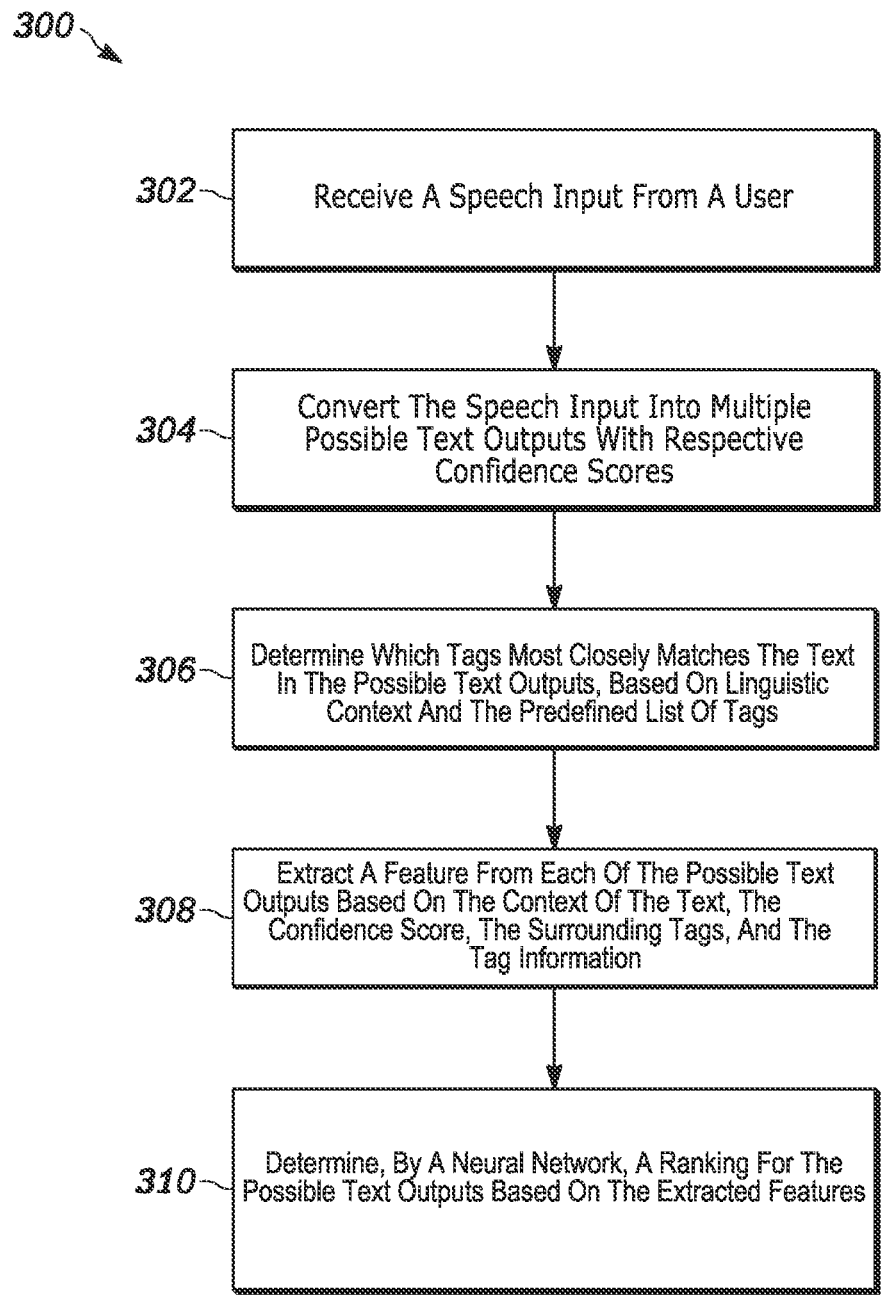
FIG. 3 is a flow chart that generally illustrates the process for processing speech input from a user, according to the principles of the present disclosure.

FIG. 3 is a block diagram illustrating a high-level overview of the speech recognition process 300. At 302, the process 300 receives voice input from a user. The voice input may be a sentence comprising of words and numbers that is received by an input device. The input device may include one or more microphones, human interface inputs such as keyboards, mice, touchscreens, voice input devices, and other similar devices. The input devices may be associated with a device that is communicatively coupled to the computing system 202. For example, the input device may be associated with a manufacturing machine (e.g., such as the manufacturing machine 700 illustrated in FIG. 7), a power tool (e.g., such as a power drill 800 in FIG. 8), an automated personal assistant (e.g., such as the automated personal assistant 900 illustrated in FIG. 9), a surveillance system (e.g., such as the surveillance system 1000 illustrated in FIG. 10), and a medical imaging system (e.g., such as the medical imaging system 1100 illustrated in FIG. 11). The input device may transmit the voice input to the computing system 202 via an information network.

At 304, the process 300 converts the speech input into text. The process 300 utilizes an automatic speech recognition component to generate multiple possible predictions of text based on the speech input. The automatic speech recognition component further outputs a confidence score associated with each text prediction. A confidence score is a value between 0 and 1 which indicates the likelihood that the output of the speech recognition component matches what was intended by the user.

At 306, the process 300 parses all the text predictions and applies tags to portions of the text (e.g., which may be referred to herein as a text string or text strings). The process 300 accesses a predefined list of tags that are each associated with a tag type. A tag type being associated with a linguistic usage of the text. Based on a determination of a closest matching tag to a portion of text is within a predetermined confidence interval, that text is tagged with the associated tag. When multiple tags are associated with the same portion of text, the portion of text receives multiple tags.

At 308, the process 300 generates one tagged text group by grouping all the text predictions, where each text prediction is grouped with the corresponding tag information. Where multiple possible ways exist to tag a text prediction, multiple copies of the respective text string are added into the tagged text group where each copy is associated with one distinct way of tagging. Features are extracted from each text string in the group based on the presentation of tags associated with the text string, the word sequence of each text string, and the confidence score of the corresponding text transcription prediction.

At 310, the process 300 utilizes a neural network ranking model to determine the ranking of the text strings in the tagged text group based on the extracted features. The top-ranked text string is treated as the new speech recognition result, while the corresponding tag information is also stored for subsequent processing. The process 300 may use the original context of each text portion. The original context being determined by the words surrounding the text portion in the initial text transcription prediction. The process 300 may further take into consideration the confidence score associated with the initial text transcription prediction and the information related to the respective tag.

It should be understood that the systems and methods described herein may be for various applications, such as those described herein with respect to FIGS. 7-11.

Figure 4:
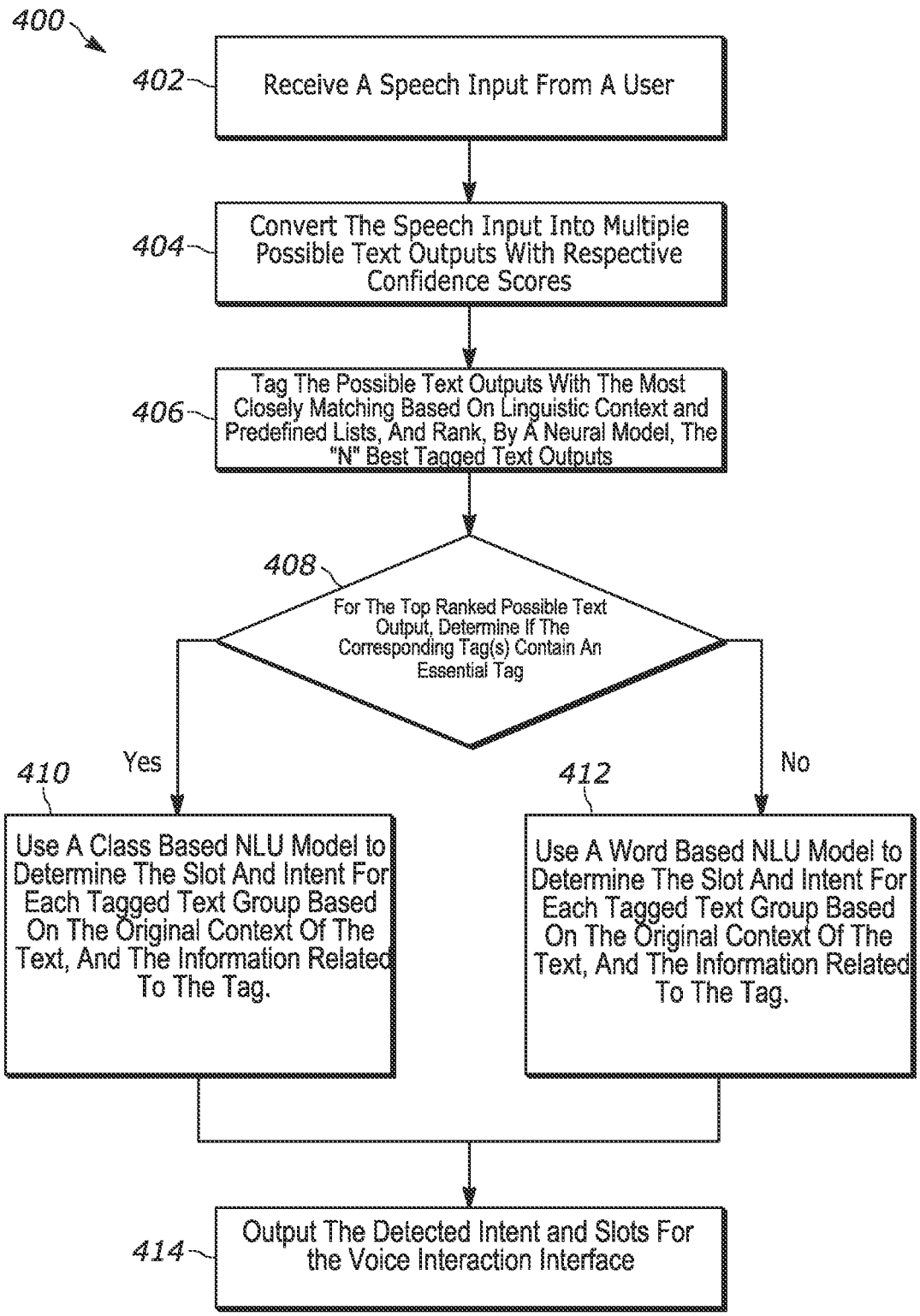
FIG. 4 is a flow chart that generally illustrates the use of multiple machine learning models while processing speech input from a user, according to the principles of the present disclosure.

FIG. 4 is a block diagram illustrating a high-level overview of the utilization of dual natural language understanding models in speech understanding process 400. The process 400 is illustrated as having a linear flow of data and is also capable of being performed in parallel utilizing computing processors with multiple cores. At 402, the process 400 receives voice input from a user. The voice input may be a sentence comprising of words and numbers that is received by a voice input device such as a microphone.

At 404, the process 400 converts the speech input into text. The process 400 utilizes an automatic speech recognition component to generate multiple possible predictions of text based on the speech input. The automatic speech recognition component further outputs a confidence score associated with each text prediction. A confidence score is a value between 0 and 1 which indicates the likelihood that the output of the speech recognition component matches what was intended by the user.

At 406, the process 400 parses all the text predictions and applies tags to portions of the text. The process 400 accesses a predefined list of possible values for some or all tag types that are each associated with a tag name. A tag type being associated with a linguistic usage of the text. Based on a determination of a closest matching tag to a portion of text, within a predetermined confidence interval, that text is tagged with the associated tag. When multiple tags are associated with the same portion of text, the portion of text receives multiple tags. At 406, the process 400 further utilizes the neural network model to rank the "n" best tagged text outputs. The neural network model used may be a feed forward neural network for joint automatic speech recognition result re-ranking and domain detection (such as the neural network model described in FIG. 5). The neural network model may further provide domain classification for the input speech sentence (based on all the "n" text outputs).

At 408, the process 400 reviews the tag types associated with the top-ranked text output among the "n" best tagged text outputs. Based on the review, the process 400 makes a determination regarding whether or not any of the tag types associated with the top-ranked text output is an essential tag type. An essential tag type may be indicated when a portion of text is not a number, date, or time. An essential tag type may also be indicated by the tag associated with the portion of text. If the top-ranked text output is determined to include an essential tag type, then the process 400 moves on to step 410, if not the process 400 moves on to step 412.

At 410, the process 400 determines that a class-based natural language understanding model should be selected for continued operations on the top-ranked text output. Utilizing a class-based natural language understanding model, the process 400 determines the slot and intent of the top-ranked text output. When determining the slot and intent, the process 400 takes into consideration the word sequence as well as the associated tags of the top-ranked text output. The process 400 may also take into consideration the original context in which each text portion is used, the confidence score associated with the text prediction where the text portion originated, and the information related to the tag. The original context of the text portion may be determined based on the sequence of text surrounding the text portion from the original text transcription prediction from which it was extracted.

At 412, the process 400, based on the determination made at 408, utilizes a word-based natural language understanding model to determine the slot and intent of the top-ranked text output based on the word sequence of that text output.

At 414, the process 400 determines the best overall determination of meaning from the original speech input received from the user. The process 400 sends the slot and the intent determined for the received speech input to the subsequence processing of the dialog system. The process 400 may use the text determination to further refine the neural network model and the natural language understanding models utilized by the system and begin the process again to provide more refined results.

Figure 5:
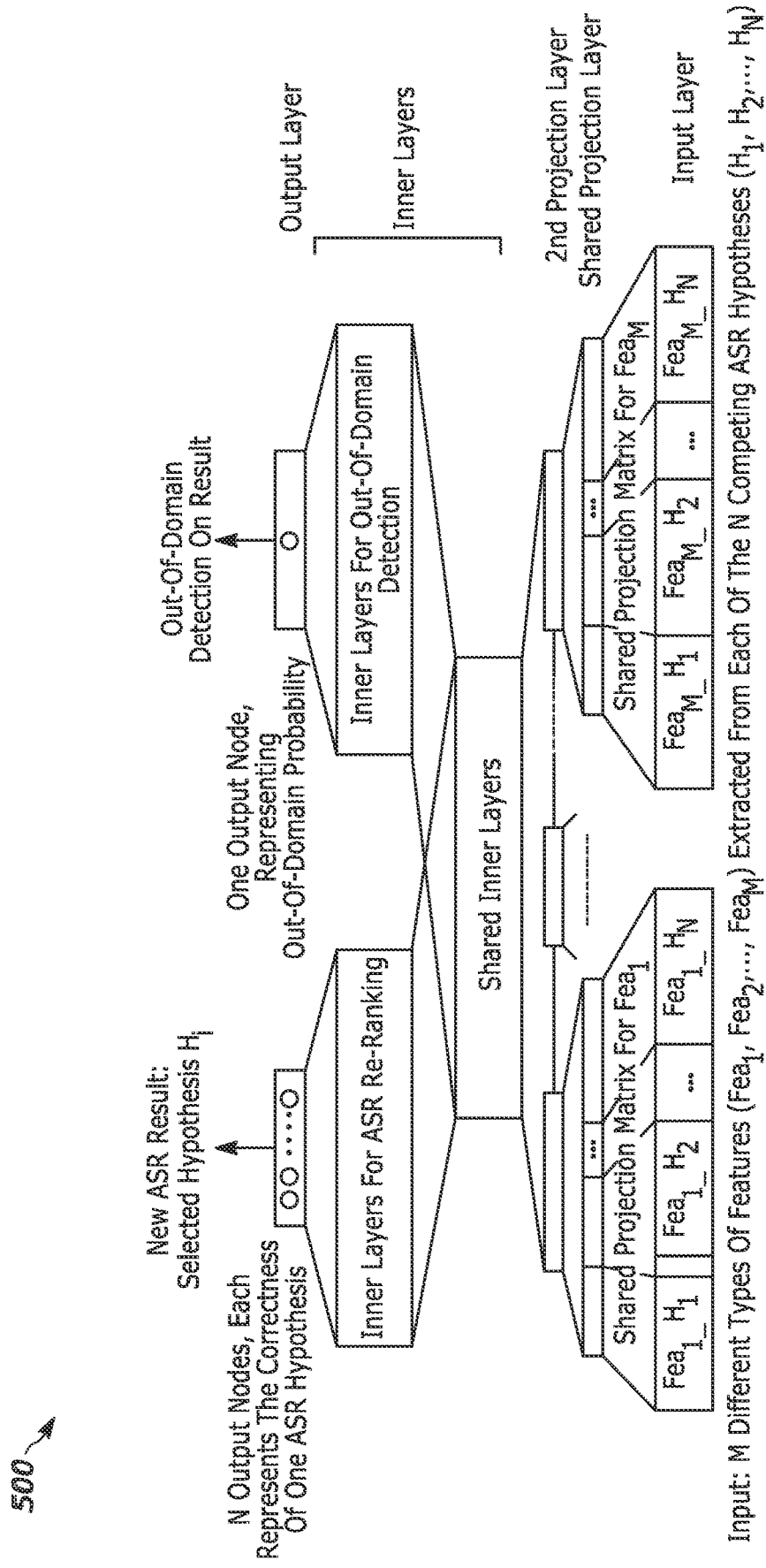
FIG. 5 generally illustrates a possible implementation of the layers shared by machine learning models, according to the principles of the present disclosure.

FIG. 5 is a diagram generally illustrating the joint neural network 500 for jointly learning an error correction task and out-of-domain detection task using a neural network. That neural network 500 having shared neural layers based on the same set of features extracted for the ranking model described above. For the neural network 500, the training for automatic speech recognition error correction and out-of-domain detection is done jointly.

One output layer is used for out-of-domain detection, which contains one node (which may be computed with a Sigmoid function) to make binary predictions regarding out-of-domain detection. The input layer of the neural network 500 are provided based on the tagging and extracting executed by the speech recognition model described above. These features may be calculated based on word sequence information, tagging information, and the confidence score related to the original text transcription predictions.

The training data for the neural network 500 may include examples of out-of-domain speech received from a user related to different use cases. Once the neural network 500 is trained, for inference computation in voice interaction applications, the only additional computation needed for the inclusion of the out-of-domain detection function is the computation associated with the separate inner layers for out-of-domain detection and the one-node out-of-domain detection output layer.

Figure 6:
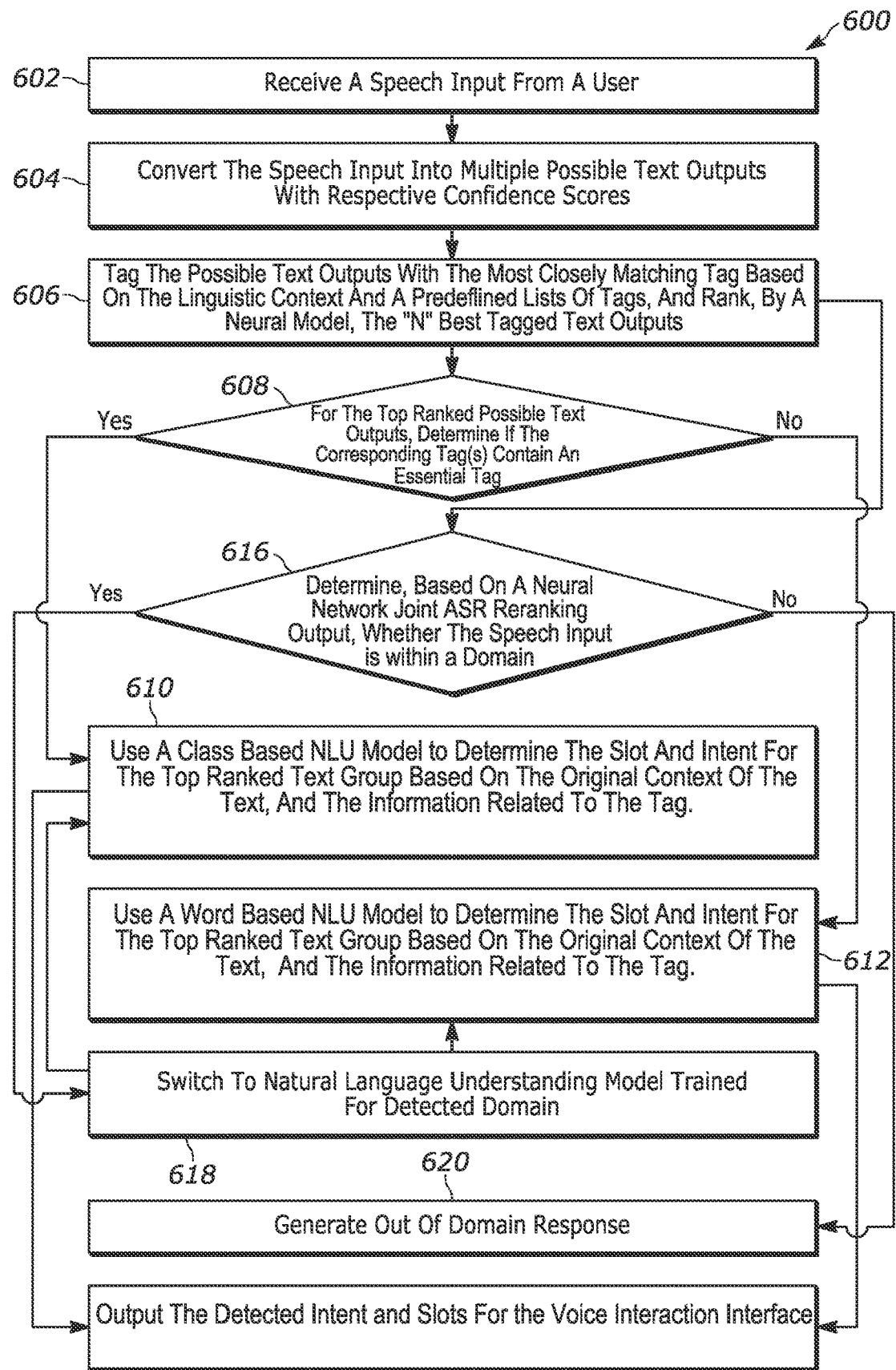
FIG. 6 is a flow chart that generally illustrates the use of multiple machine learning models while processing speech input from a user with out-of-domain detection, according to the principles of the present disclosure.

FIG. 6 is a block diagram illustrating a high-level overview of the utilization of dual natural language understanding models in speech understanding process 600 with domain detection. The process 600 is illustrated as having a linear flow of data and is also capable of being performed in parallel utilizing computing processors with multiple cores. At 602, the process 600 receives voice input from a user. The voice input may be a sentence comprising of words and numbers that is received by a voice input device such as a microphone.

At 604, the process 600 converts the speech input into text. The process 600 utilizes an automatic speech recognition component to generate multiple possible predictions of text based on the speech input. The automatic speech recognition component further outputs a confidence score associated with each text prediction. A confidence score is a value between 0 and 1 which indicates the likelihood that the output of the speech recognition component matches what was intended by the user.

At 606, the process 600 parses all the text predictions and applies tags to portions of the text. The process 600 accesses the predefined list of possible values for some or all tag types that are each associated with a tag type. A tag type being associated with a linguistic usage of the text. Based on a determination of a closest matching tag to a portion of text within a predetermined confidence interval, that text is tagged with the associated tag. When multiple tags are associated with the same portion of text, the portion of text receives multiple tags. At 606, the process 600 further utilizes the neural network model to rank the "n" best tagged text outputs. The neural network model used may be a feed-forward neural network for joint automatic speech recognition result re-ranking and domain detection (such as the neural network model described in FIG. 5). The neural network model may further provide domain classification for the input speech sentence (based on all the "n" text outputs).

At 608, the process 600 reviews the tag types associated with the top-ranked text output among the "n" best tagged text outputs. Based on the review, the process 600 makes a determination regarding whether or not any of the tag types associated with the top-ranked text output is an essential tag type. An essential tag type may be indicated when a portion of text is not a number, date, or time. An essential tag type may also be indicated by the tag associated with the portion of text. If the top-ranked text output is determined to contain an essential tag type, then the process 600 moves on to step 610, if not the process 600 moves on to step 612.

At 610, the process 600 determines that a class-based natural language understanding model should be selected for continued operations on the top-ranked text output. Utilizing a class-based natural language understanding model, the process 600 determines the slot and intent of the top-ranked text output. When determining the slot and intent, the process 600 takes into consideration the word sequence as well as the associated tags of the top-ranked text output. The original context of the text portion may be determined based on the sequence of text surrounding the text portion from the original text transcription prediction from which it was extracted.

At 612, the process 600, based on the determination made at 608, utilizes a word-based natural language understanding model to determine the slot and intent of the top-ranked text output purely based on the word sequence of that text output.

At 614, the process 600 determines the best overall determination of meaning from the original speech input received from the user and outputs to the intent and slot of the speech input of the user. The process 600 sends the slot and the intent determined for the received speech input for processing by the dialog interface.

At 616, the process 600 determines, by a neural network, if the top-ranked text output is related to one of the domains the natural language understanding models have been trained for. If the neural network indicates that the speech input was out of domain, the system moves to 620. At 620, the process 600 generates an output to the user indicating that the system cannot handle a speech utterance that is out of domain. If the neural network indicates that the speech input was in a domain the natural language understanding models are trained for then the process 600 continues to 618. At 618, the processor communicates to the natural language understanding model chosen at 608 and directs them to use the corresponding class-based or word-based natural language model trained for the detected domain.

Figure 7:
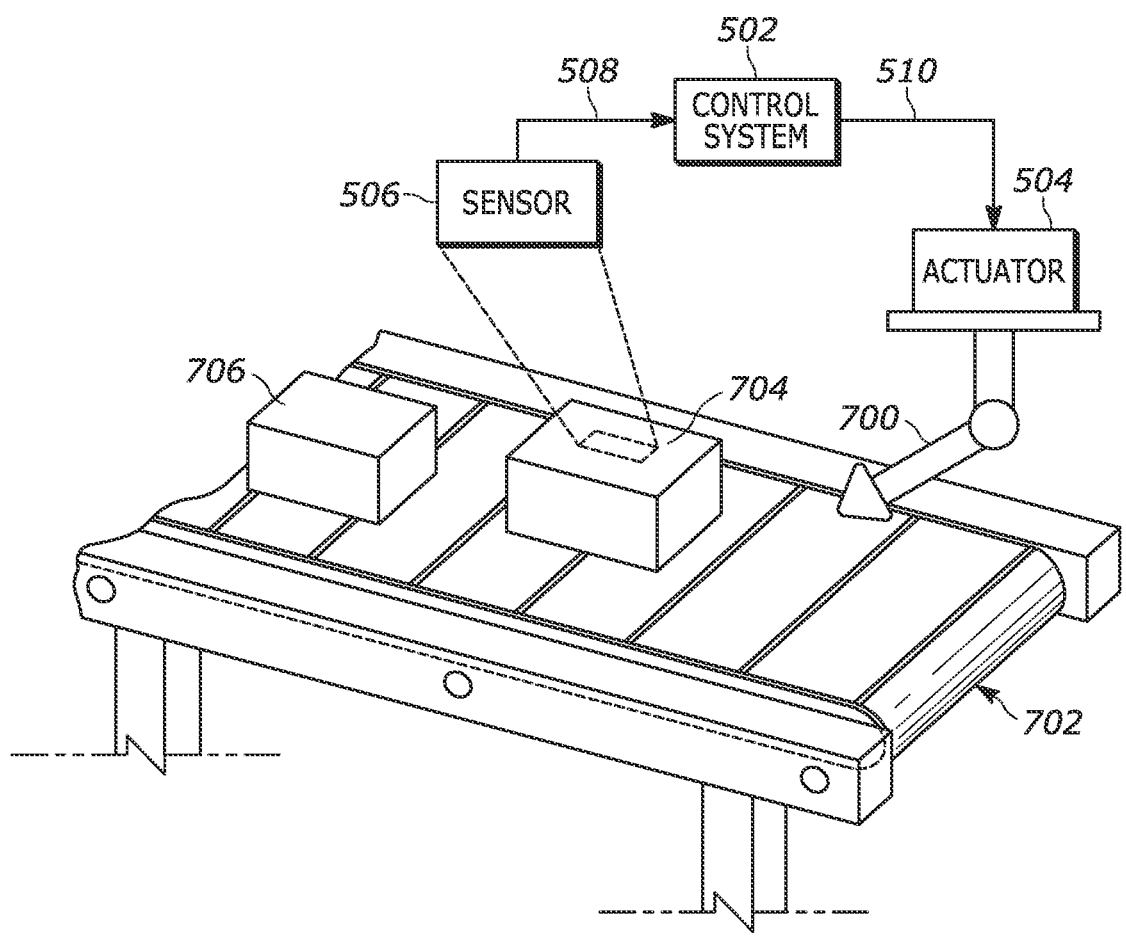
FIG. 7 depicts a schematic diagram of the control system of FIG. 5 configured to control a manufacturing machine, such as a punchcutter, a cutter, or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
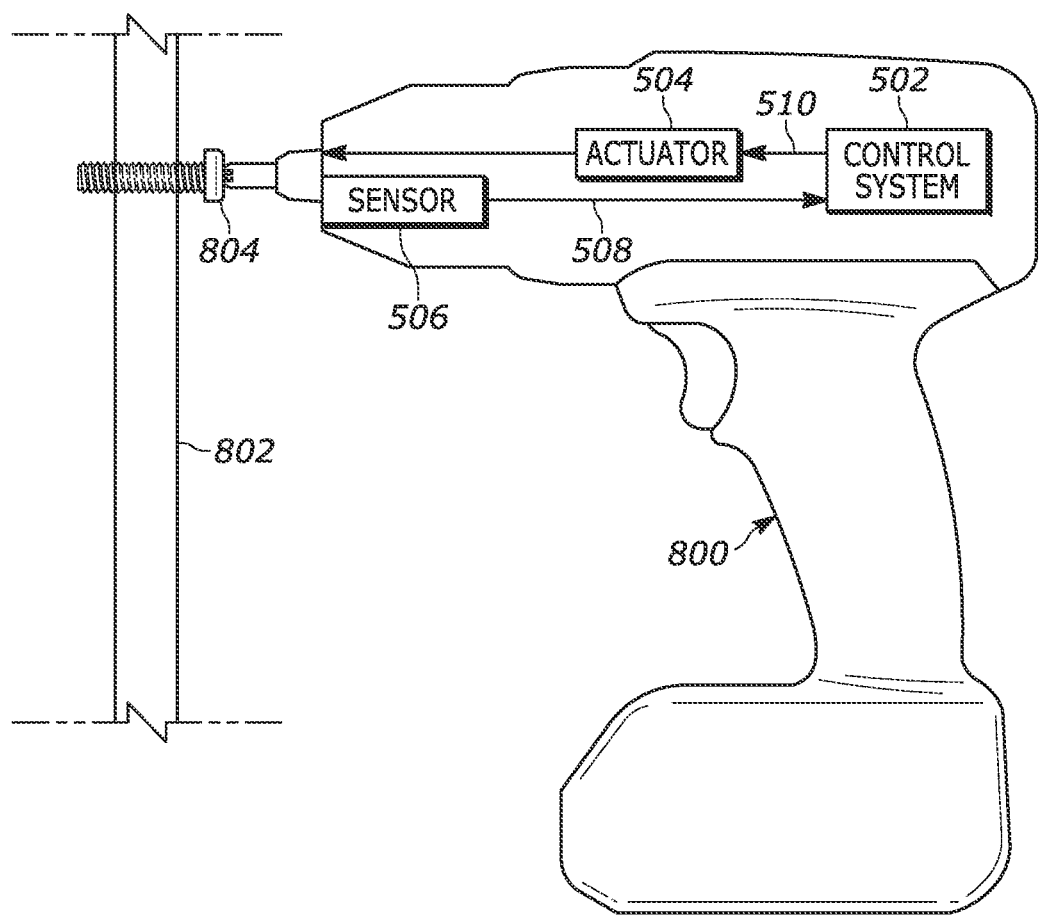
FIG. 8 depicts a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
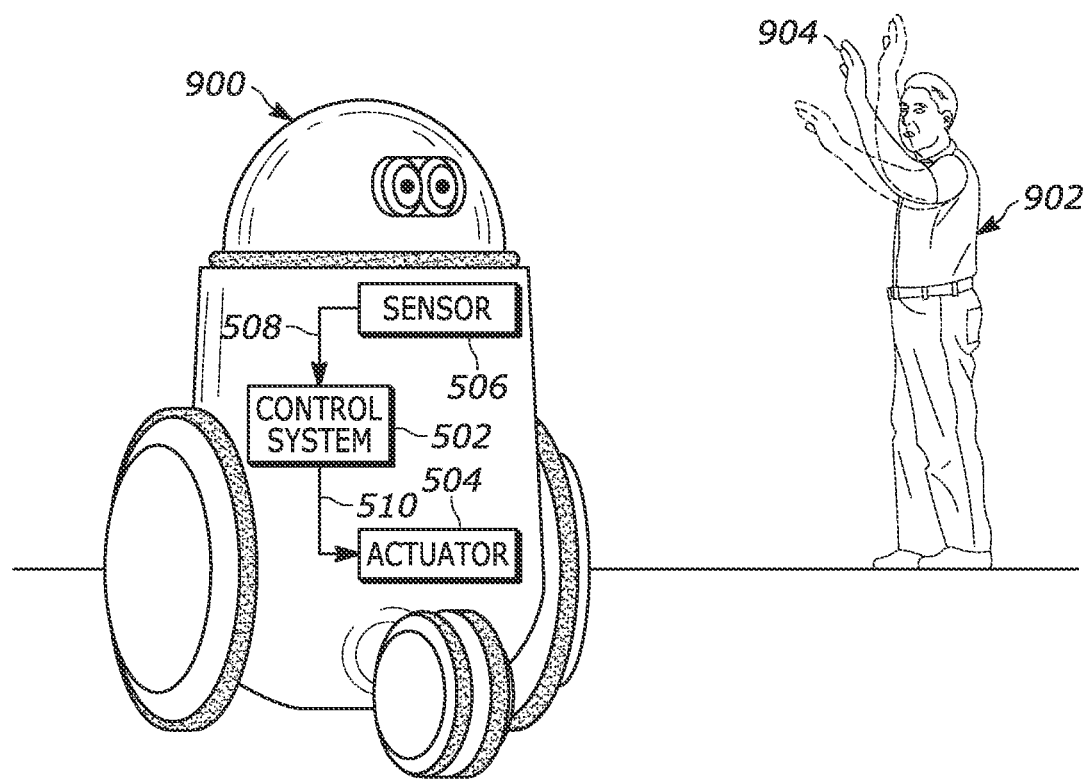
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
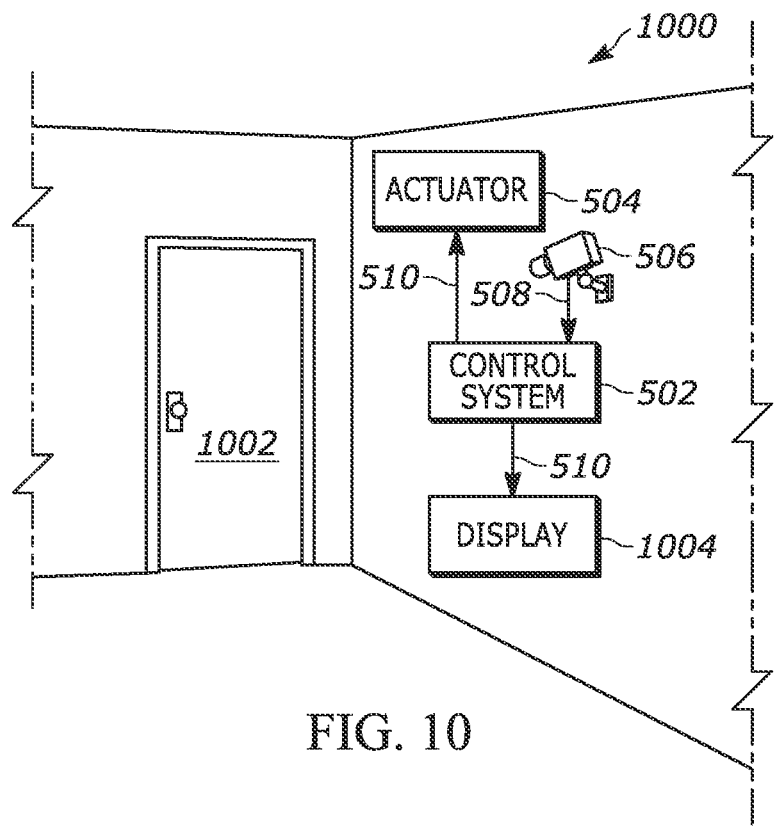
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
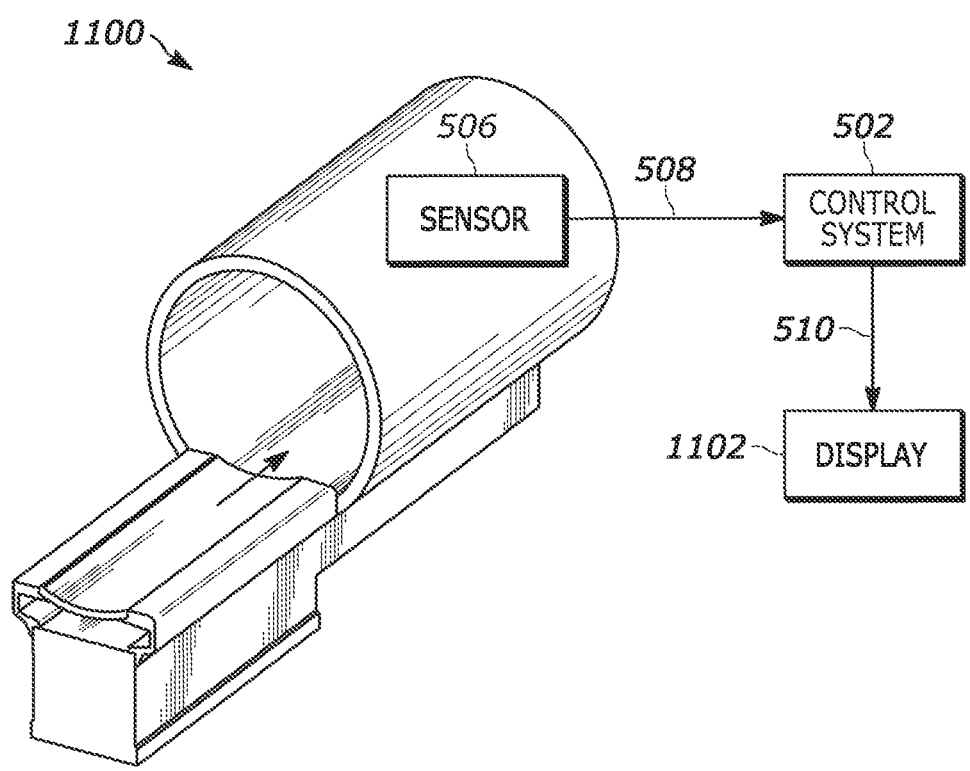
FIG. 11 depicts a schematic diagram of the control system of FIG. 5 configured to control an imaging system, for example, an Mill apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

In some embodiments, the method for speech understanding includes receiving a speech input. The method also includes generating, by at least one speech recognition model, at least a first text transcription prediction and a second text transcription prediction by converting the speech input into a text string. The method also includes generating a first confidence score for the first text transcription prediction and a second confidence score for the second text transcription prediction. The method also includes determining, for respective text strings of the first text transcription prediction and the second text transcription prediction, a tag type, based on a similar linguistic usage of each respective text string. The method also includes applying tags to the respective text strings of the first text transcription prediction and the second text transcription prediction based on the tag type for each respective text string of the first text transcription prediction and the second text transcription prediction, wherein each tag corresponds to one or more slot types. The method also includes generating at least one tagged text group by extracting at least one text string of the first text transcription prediction and grouping the at least one text string with at least one text string of the second text transcription prediction based on a tag associated with the at least one text string of the first text transcription prediction and a tag associated with the at least one text string of the second text transcription prediction. The method also includes determining, using a natural language understanding model, a relevance ranking of the text strings within the at least one tagged text group based on the tag type of the tag associated with the tagged text group, a word sequence of the first text transcription prediction, a word sequence of the second text transcription prediction, the first confidence score, and the second confidence score.

In some embodiments, the method may further include the natural language understanding model being one of a class-based natural language understanding model and a word-based natural language understanding model. In some embodiments, the method may further include selecting the class-based natural language understanding model in response to the tag of the tagged text group indicating an essential tag type, and selecting the word-based natural language understanding model in response to the tag of the tagged text group not indicating an essential tag type.

In some embodiments, the method may further include at least one tag corresponding to an empty tag type that does not include a description. The method may further include a tagged text group related to the empty tag type being discarded. In some embodiments, the method may further include applying multiple tags for a respective text string where there are multiple possible ways to tag the text, and associating a copy of the respective text string to the tagged text group associated with the respective tag.

In some embodiments, the method may further include the natural language understanding model having at least one layer configured to identify text that does not correspond to a tag type. In some embodiments, the method may further include the text portions being associated with a tagged text group having a similar linguistic usage.

In some embodiments, a system speech understanding includes receiving a speech input. The system also includes generating, by at least one speech recognition model, at least a first text transcription prediction and a second text transcription prediction by converting the speech input into a text string. The system also includes generating a first confidence score for the first text transcription prediction and a second confidence score for the second text transcription prediction. The system also includes determining, for respective text strings of the first text transcription prediction and the second text transcription prediction, a tag type, based on a similar linguistic usage of each respective text string. The system also includes applying tags to the respective text strings of the first text transcription prediction and the second text transcription prediction based on the tag type for each respective text string of the first text transcription prediction and the second text transcription prediction, wherein each tag corresponds to one or more slot types. The system also includes generating at least one tagged text group by extracting at least one text string of the first text transcription prediction and grouping the at least one text string with at least one text string of the second text transcription prediction based on a tag associated with the at least one text string of the first text transcription prediction and a tag associated with the at least one text string of the second text transcription prediction. The system also includes determining, using a natural language understanding model, a relevance ranking of the text strings within the at least one tagged text group based on the tag type of the tag associated with the tagged text group, a word sequence of the first text transcription prediction, a word sequence of the second text transcription prediction, the first confidence score, and the second confidence score.

In some embodiments, the system may further include the natural language understanding model being one of a class-based natural language understanding model and a word-based natural language understanding model. In some embodiments, the system may further include selecting the class-based natural language understanding model in response to the tag of the tagged text group indicating an essential tag type, and selecting the word-based natural language understanding model in response to the tag of the tagged text group not indicating an essential tag type.

In some embodiments, the system may further include at least one tag corresponding to an empty tag type that does not include a description. The system may further include a tagged text group related to the empty tag type being discarded. In some embodiments, the system may further include applying multiple tags for a respective text string where there are multiple possible ways to tag the text, and associating a copy of the respective text string to the tagged text group associated with the respective tag.

In some embodiments, the system may further include the natural language understanding model having at least one layer configured to identify text that does not correspond to a tag type. In some embodiments, the system may further include the text portions being associated with a tagged text group having a similar linguistic usage.

In some embodiments, an apparatus for speech understanding includes receiving a speech input. The apparatus also includes generating, by at least one speech recognition model, at least a first text transcription prediction and a second text transcription prediction by converting the speech input into a text string. The apparatus also includes generating a first confidence score for the first text transcription prediction and a second confidence score for the second text transcription prediction. The apparatus also includes determining, for respective text strings of the first text transcription prediction and the second text transcription prediction, a tag type, based on a similar linguistic usage of each respective text string. The apparatus also includes applying tags to the respective text strings of the first text transcription prediction and the second text transcription prediction based on the tag type for each respective text string of the first text transcription prediction and the second text transcription prediction, wherein each tag corresponds to one or more slot types. The apparatus also includes generating at least one tagged text group by extracting at least one text string of the first text transcription prediction and grouping the at least one text string with at least one text string of the second text transcription prediction based on a tag associated with the at least one text string of the first text transcription prediction and a tag associated with the at least one text string of the second text transcription prediction. The apparatus also includes determining, using a natural language understanding model, a relevance ranking of the text strings within the at least one tagged text group based on the tag type of the tag associated with the tagged text group, a word sequence of the first text transcription prediction, a word sequence of the second text transcription prediction, the first confidence score, and the second confidence score.

In some embodiments, the apparatus may further include the natural language understanding model being one of a class-based natural language understanding model and a word-based natural language understanding model. In some embodiments, the apparatus may further include selecting the class-based natural language understanding model in response to the tag value of the tagged text group indicating an essential tag type, and selecting the word-based natural language understanding model in response to the tag value of the tagged text group not indicating an essential tag type.

In some embodiments, the apparatus may further include at least one tag corresponding to an empty tag type that does not include a description. The apparatus may further include a tagged text group related to the empty tag type being discarded. In some embodiments, the apparatus may further include applying multiple tags for a respective text string where there are multiple possible ways to tag the text, and associating a copy of the respective text string to the tagged text group associated with the respective tag.

In some embodiments, the apparatus may further include the natural language understanding model having at least one layer configured to identify text that does not correspond to a tag type. In some embodiments, the apparatus may further include the text portions being associated with a tagged text group having a similar linguistic usage.

In some embodiments, an apparatus for speech understanding includes receiving a speech input. The apparatus also includes generating, by at least one speech recognition model, at least a first text transcription prediction and a second text transcription prediction by converting the speech input into a text string. The apparatus also includes generating a first confidence score for the first text transcription prediction and a second confidence score for the second text transcription prediction. The apparatus also includes determining, for respective text strings of the first text transcription prediction and the second text transcription prediction, a tag type, based on the linguistic context of each respective text string. The apparatus also includes applying tags to the respective text strings of the first text transcription prediction and the second text transcription prediction based on the tag type for each respective text string of the first text transcription prediction and the second text transcription prediction, wherein each tag corresponds to one or more slot types. The apparatus also includes generating at least one tagged text group by extracting at least one text string of the first text transcription prediction and grouping the at least one text string with at least one text string of the second text transcription prediction, each text string included into the text group together with the corresponding tags if any. The apparatus described herein is configured to rank the text strings in the tagged text group based on the presentation of tags associated with each text string, the word sequence of each text string, and the confidence score of the corresponding text transcription prediction. The apparatus also includes determining, using a natural language understanding model, the intent and slots for the top-ranked text string.

In some embodiments, the apparatus may further include the natural language understanding model being one of a class-based natural language understanding model and a word-based natural language understanding model. In some embodiments, the apparatus may further include selecting the class-based natural language understanding model in response to the tag of the top-ranked text string indicating an essential tag type, and selecting the word-based natural language understanding model in response to the tag of the top-ranked text string not indicating an essential tag type.

In some embodiments, the apparatus may further include one empty text string with no tag associated with it into the tagged text group. The apparatus may further treat the case that the top-ranked text string in the tagged text group is the empty text string as a failure of automatic speech recognition and generate dialog response correspondingly. In some embodiments, the apparatus may further include applying multiple tags for a respective text string where there are multiple possible ways to tag the text, and associating a copy of the respective text string to the tagged text group associated with the respective tag.

In some embodiments, the apparatus may further include the natural language understanding model having at least one layer configured to identify the intent and slots for the top-ranked text string.

In some embodiments, a method for identifying a text string associated with a speech input includes receiving a speech input from a speech-based dialogue interface; generating, by at least one speech recognition model, first and second text transcription predictions by converting the speech input into respective text strings; generating a first confidence score for the first text transcription prediction and a second confidence score for the second text transcription prediction; determining a slot type for respective text strings of the first text transcription prediction and the second text transcription prediction; applying tags to the respective text strings of the first text transcription prediction and the second text transcription prediction based on the slot type for each respective text string, wherein each tag corresponds to one of the slot types; generating at least one tagged text group by extracting at least one text string of the first text transcription prediction and grouping the at least one text string with at least one text string of the second text transcription prediction based on a tag associated with the text strings; determining, using a natural language model, a relevance ranking of the text strings within the at least one tagged text group based on, at least, the slot type of the tag associated with the tagged text group, the first confidence score, and the second confidence score; and identifying a text string of the at least one tagged text group having a highest relevance ranking, wherein the text string of the at least one tagged text group having the highest relevance ranking is provided to the speech-based dialogue interface.

In some embodiments, the natural language model is one of a class-based natural language understanding model and a word-based natural language understanding model. In some embodiments, the method also includes selecting the class-based natural language understanding model in response to a tag value of the tagged text group indicating an essential tag type, and selecting the word-based natural language understanding model in response to a tag value of the tagged text group not indicating an essential tag type. In some embodiments, at least one tag corresponds to an empty tag type that does not include a description. In some embodiments, a tagged text group related to the empty tag type is discarded. In some embodiments, the method also includes applying multiple tags for a respective text string, and associating a copy of the respective text string to the tagged text group associated with a respective tag. In some embodiments, the natural language model includes at least one layer configured to identify text that does not correspond to a tag type. In some embodiments, the text strings associated with a tagged text group include a similar linguistic usage.

In some embodiments, a system for outputting, at a speech-based dialogue interface, a text string associated with a speech input includes a processor and a memory. The memory includes instructions that, when executed by the processor, cause the processor to: receive a speech input from a speech-based dialogue interface by at least one input device; generate, by at least one speech recognition model, first and second text transcription predictions by converting the speech input into respective text strings; generate a first confidence score for the first text transcription prediction and a second confidence score for the second text transcription prediction; determine a slot type for respective text strings of the first text transcription prediction and the second text transcription prediction; apply tags to the respective text strings of the first text transcription prediction and the second text transcription prediction based on the slot type for each respective text string, wherein each tag corresponds to one of the slot types; generate at least one tagged text group by extracting at least one text string of the first text transcription prediction and grouping the at least one text string with at least one text string of the second text transcription prediction based on a tag associated with the text strings; determine, using a natural language model, a relevance ranking of the text strings within the at least one tagged text group based on, at least, the slot type of the tag associated with the tagged text group, the first confidence score, and the second confidence score; identify a text string of the at least one tagged text group having a highest relevance ranking; and output the text string of the at least one tagged text group having the highest relevance ranking to the speech-based dialogue interface.

In some embodiments, the natural language model is one of a class-based natural language understanding model and a word-based natural language understanding model. In some embodiments, the instructions further cause the processor to select the class-based natural language understanding model in response to a tag value of the tagged text group indicating an essential tag type, and select the word-based natural language understanding model in response to a tag value of the tagged text group not indicating an essential tag type. In some embodiments, at least one tag corresponds to an empty tag type that does not include a description. In some embodiments, a tagged text group related to the empty tag type is discarded. In some embodiments, the instructions further cause the processor to apply multiple tags for a respective text string, and associate a copy of the respective text string to the tagged text group associated with a respective tag. In some embodiments, the natural language model includes at least one layer configured to identify text that does not correspond to a tag type. In some embodiments, the text strings associated with a tagged text group include a similar linguistic usage.

In some embodiments, an apparatus for identifying a text string associated with a speech input includes a processor and a memory. The memory includes instructions that, when executed by the processor, cause the processor to: receive a speech input from a speech-based dialogue interface; generate, by at least one speech recognition model, first and second text transcription predictions by converting the speech input into respective text strings; generate a first confidence score for the first text transcription prediction and a second confidence score for the second text transcription prediction; determine a slot type for respective text strings of the first text transcription prediction and the second text transcription prediction; apply tags to the respective text strings of the first text transcription prediction and the second text transcription prediction based on the slot type for each respective text string, wherein each tag corresponds to one of the slot types; generate at least one tagged text group by extracting at least one text string of the first text transcription prediction and grouping the at least one text string with at least one text string of the second text transcription prediction based on a tag associated with the text strings; determine, using a natural language model, a relevance ranking of the text strings within the at least one tagged text group based on, at least, the slot type of the tag associated with the tagged text group, the first confidence score, and the second confidence score; and identify a text string of the at least one tagged text group having a highest relevance ranking.

In some embodiments, the natural language model is one of a class-based natural language understanding model and a word-based natural language understanding model. In some embodiments, at least one tag corresponds to an empty tag type that does not include a description. In some embodiments, a tagged text group related to the empty tag type is discarded.

In some embodiments, the input device includes at least one microphone, and wherein the input device is associated with at least one of a stand-alone device such as, at least one of, a manufacturing machine, a power tool, an automated personal assistant, a domestic appliance, surveillance system, and a medical imaging system.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for identifying a text string associated with a speech input, the method comprising:
receiving a speech input from a speech-based dialogue interface;
generating, by at least one speech recognition model, first and second text transcription predictions by converting the speech input into respective text strings;
generating a first confidence score for the first text transcription prediction and a second confidence score for the second text transcription prediction;
determining a slot type for respective text strings of the first text transcription prediction and the second text transcription prediction;
applying tags to the respective text strings of the first text transcription prediction and the second text transcription prediction based on the slot type for each respective text string, wherein each tag corresponds to one of the slot types or to an empty tag type that does not include a description;
generating at least one tagged text group by extracting at least one text string of the first text transcription prediction and grouping the at least one text string with at least one text string of the second text transcription prediction based on a tag associated with the text strings;
in response to a determination that the tag of the at least one text string of the first text transcription prediction and the tag of the at least one text string of the second text transcription prediction corresponds to one of the slot types:

determining, using a natural language model, a relevance ranking of the text strings within the at least one tagged text group based on, at least, the slot type of the tag associated with the tagged text group, the first confidence score, and the second confidence score; and identifying a text string of the at least one tagged text group having a highest relevance ranking, wherein the text string of the at least one tagged text group having the highest relevance ranking is provided to the speech-based dialogue interface; and in response to a determination that the tag of the at least one text string of the first text transcription prediction and the tag of the at least one text string of the second text transcription prediction corresponds to the empty tag type, discard the at least one tagged text group.

2. The method of claim 1, wherein the natural language model is one of a class-based natural language understanding model and a word-based natural language understanding model.

3. The method of claim 2, further comprising:
selecting the class-based natural language understanding model in response to a tag value of the tagged text group indicating an essential tag type; and
selecting the word-based natural language understanding model in response to a tag value of the tagged text group not indicating an essential tag type.

4. The method of claim 1, further comprising:
applying multiple tags for a respective text string; and
associating a copy of the respective text string to the tagged text group associated with a respective tag.

5. The method of claim 1, wherein the natural language model includes at least one layer configured to identify text that does not correspond to a tag type.

6. The method of claim 1, wherein the text strings associated with a tagged text group include a similar linguistic usage.

7. A system for outputting, at a speech-based dialogue interface, a text string associated with a speech input, the system comprising:
a processor; and
a memory including instructions that, when executed by the processor, cause the processor to:
receive a speech input from a speech-based dialogue interface;
generate, by at least one speech recognition model, first and second text transcription predictions by converting the speech input into respective text strings;
generate a first confidence score for the first text transcription prediction and a second confidence score for the second text transcription prediction;
determine a slot type for respective text strings of the first text transcription prediction and the second text transcription prediction;
apply tags to the respective text strings of the first text transcription prediction and the second text transcription prediction based on the slot type for each respective text string, wherein each tag corresponds to one of the slot types or to an empty tag type that does not include a description;
generate at least one tagged text group by extracting at least one text string of the first text transcription prediction and grouping the at least one text string with at least one text string of the second text transcription prediction based on a tag associated with the text strings;

in response to a determination that the tag of the at least one text string of the first text transcription prediction and the tag of the at least one text string of the second text transcription prediction corresponds to one of the slot types:
determine, using a natural language model, a relevance ranking of the text strings within the at least one tagged text group based on, at least, the slot type of the tag associated with the tagged text group, the first confidence score, and the second confidence score;
identify a text string of the at least one tagged text group having a highest relevance ranking; and
output the text string of the at least one tagged text group having the highest relevance ranking to the speech-based dialogue interface; and
in response to a determination that the tag of the at least one text string of the first text transcription prediction and the tag of the at least one text string of the second text transcription prediction corresponds to the empty tag type, discard the at least one tagged text group.

8. The system of claim 7, wherein the natural language model is one of a class-based natural language understanding model and a word-based natural language understanding model.

9. The system of claim 8, wherein the instructions further cause the processor to:
select the class-based natural language understanding model in response to a tag value of the tagged text group indicating an essential tag type; and
select the word-based natural language understanding model in response to a tag value of the tagged text group not indicating an essential tag type.

10. The system of claim 7, wherein at least one tag corresponds to an empty tag type that does not include a description.

11. The system of claim 10, wherein a tagged text group related to the empty tag type is discarded.

12. The system of claim 7, wherein the instructions further cause the processor to:
apply multiple tags for a respective text string; and
associate a copy of the respective text string to the tagged text group associated with a respective tag.

13. An apparatus for identifying a text string associated with a speech input, the apparatus comprising:
a processor; and
a memory including instructions that, when executed by the processor, cause the processor to:
receive a speech input from a speech-based dialogue interface captured by at least one input device;
generate, by at least one speech recognition model, first and second text transcription predictions by converting the speech input into respective text strings;
generate a first confidence score for the first text transcription prediction and a second confidence score for the second text transcription prediction;
determine a slot type for respective text strings of the first text transcription prediction and the second text transcription prediction;
apply tags to the respective text strings of the first text transcription prediction and the second text transcription prediction based on the slot type for each respective text string, wherein each tag corresponds to one of the slot types or to an empty tag type that does not include a description;
generate at least one tagged text group by extracting at least one text string of the first text transcription prediction and grouping the at least one text string with at least one text string of the second text transcription prediction based on a tag associated with the text strings;

in response to a determination that the tag of the at least one text string of the first text transcription prediction and the tag of the at least one text string of the second text transcription prediction corresponds to one of the slot types:

determine, using a natural language model, a relevance ranking of the text strings within the at least one tagged text group based on, at least, the slot type of the tag associated with the tagged text group, the first confidence score, and the second confidence score; and identify a text string of the at least one tagged text group having a highest relevance ranking; and in response to a determination that the tag of the at least one text string of the first text transcription prediction and the tag of the at least one text string of the second text transcription prediction corresponds to the empty tag type, discard the at least one tagged text group.

14. The apparatus of claim 13, wherein the natural language model is one of a class-based natural language understanding model and a word-based natural language understanding model.

15. The apparatus of claim 13, wherein the at least one input device includes at least one microphone, and wherein the at least one input device is associated with at least one of a manufacturing machine, a power tool, an automated personal assistant, a domestic appliance, surveillance system, and a medical imaging system.

\* \* \* \* \*